United States Patent [19]
Ushiro

[11] Patent Number: 4,809,095
[45] Date of Patent: Feb. 28, 1989

[54] RECORDING AND REPRODUCING APPARATUS SELECTIVELY USING A PLURALITY OF KINDS OF RECORDING MEDIUMS

[75] Inventor: Tatsuzo Ushiro, Tokyo, Japan

[73] Assignee: Canon Kabushiki Kaisha, Tokyo, Japan

[21] Appl. No.: 58,041

[22] Filed: Jun. 4, 1987

Related U.S. Application Data

[62] Division of Ser. No. 513,235, Jul. 13, 1983, Pat. No. 4,722,015.

[30] Foreign Application Priority Data

Jul. 19, 1982 [JP] Japan .................. 57-125266

[51] Int. Cl.$^4$ .................. G11B 21/02; G11B 15/14; G11B 5/54
[52] U.S. Cl. .................. 360/75; 360/64; 360/105
[58] Field of Search .................. 360/105, 107, 84, 85, 360/64, 75, 128, 130.22, 130.23, 130.24, 63, 65, 66, 94

[56] References Cited

U.S. PATENT DOCUMENTS

| | | | |
|---|---|---|---|
| 3,076,060 | 1/1963 | Horstkorta | 360/105 |
| 3,685,171 | 8/1972 | Kosaka | 360/132 |
| 3,900,889 | 8/1975 | Broghammer | 360/66 |
| 4,135,218 | 1/1979 | Nakamura et al. | 360/110 |
| 4,475,137 | 10/1984 | Yasuda et al. | 360/126 |

FOREIGN PATENT DOCUMENTS

| | | | |
|---|---|---|---|
| EP023067 | 1/1981 | European Pat. Off. | 360/84 |
| 52-010712 | 1/1977 | Japan | 360/95 |
| 54-073616 | 6/1979 | Japan | 360/105 |
| 55-052560 | 4/1980 | Japan | 360/75 |

OTHER PUBLICATIONS

Yasuda et al., "Newly Developed Sendust Video Head for High Coercive Tape," IEEE Transactions on Magnetics, vol. MAG-16, No. 5, Sep. 1980, pp. 870–872.

Bendson, "New Wear-Resistant Permalloy Material for Magnetic Recording-Head Application," Journal of the Audio Engineering Society, vol. 24, No. 7, Sep. 1976, pp. 562–567.

*Primary Examiner*—John H. Wolff
*Assistant Examiner*—Matthew J. Bussan
*Attorney, Agent, or Firm*—Toren, McGeady & Associates

[57] ABSTRACT

Disclosed is a recording and/or reproducing apparatus which comprises heads of at least two different kinds, carrying apparatus operative for receiving a recording medium, discriminating apparatus for discriminating the kind of the recording medium being carried by the carrying apparatus, selecting apparatus for selecting one kind of heads out of the different kinds in response to the discriminating apparatus and control apparatus which is provided for at least one kind of head selected out of the heads of different kinds to control contact of the head with the recording medium in response to the selecting apparatus.

11 Claims, 5 Drawing Sheets

RECORDING AND REPRODUCING APPARATUS SELECTIVELY USING A PLURALITY OF KINDS OF RECORDING MEDIUMS

This is a division of application Ser. No. 513,235, filed July 13, 1983 now U.S. Pat. No. 4,722,015.

BACKGROUND OF THE INVENTION

1. Field of the Invention

This invention relates to a recording and/or reproducing apparatus and more particularly to a recording and/or reproducing apparatus arranged to selectively use one kind of heads among different kinds of heads according to the kind of a recording medium to be used.

2. Description of the Prior Art

In this specification, magnetic recording and/or reproducing apparatuses of the rotary two-head type using a mangetic tape as recording medium (hereinafter will be called VTR) will be described by way of example.

During recent years, there have been conspicuous improvements in the properties of magnetic materials. For example, magnetic recording density on a recording medium has been improved by the use of an alloy powder tape (hereinafter will be called the metal tape), a vapor deposition or evaporation tape, or the like. As a result of this, it has lately become possible to record signals of 4 to 5 MHz even at a relative speed of 3 m/sec. At present, about the same picture quality can be obtained from the metal tape and the evaporation tape. It is hardly possible to predict what kind of tape will come to be chiefly used in the future. Therefore, it is desirable to have the current VTR's arranged to permit video signal recording on both the metal tape and the evaporation tape by advantageously utilizing their respective characteristics and also to permit reproduction of recorded video signals from both.

However, the metal tape has a large coercive force as a magnetic characteristic. Where the metal tape is used, therefore, magnetic recording cannot be adequately accomplished with a head employing ferrite or the like employed as a core member. Hence, VTR's adapted for use of the metal tape generally use a head employing Sendust which is an Fe-Si-Al alloy. However, the head employing Sendust is harder than the head employing ferrite and is brittle against an external force. The Sendust head is also inferior to the ferrite head in terms of antifriction property.

A head usable for recording media of all the different kinds inevitably has a shorter service life or becomes expensive. In the VTR, use of both the evaporation tape and the metal tape necessitates use of the Sendust head. However, the short life of the Sendust head inevitably shortens the service life of the VTR.

SUMMARY OF THE INVENTION

Such being the shortcoming of the prior art VTR's, it is an object of the present invention to provide a recording and/or reproducing apparatus in which the contact of a head with a recording medium is controlled to ensure a long life of the apparatus as well as to render the apparatus operatable on recording media of at least two different kinds for advantageous utilization of their characteristics.

It is another object of the invention to provide a video signal recording and/or reproducing apparatus in which the contact of a rotary head with a magnetic tape is controlled by selecting out of rotary heads of two different kinds a head that is suited for the magnetic tape in use.

It is a further object of the invention to provide a rotary head assembly which is suited for control of the contact of a rotary head with a magnetic tape.

A still further object of the invention is to provide a head driving device which is capable of driving a head to move perpendicularly to a sliding contact plane between the head and a recording medium with simple structural arrangement.

These and further objects and features of the invention will become apparent from the following detailed description of preferred embodiments thereof taken in connection with the accompanying drawings.

DETAILED DESCRIPTION OF PREFERRED EMBODIMENTS

Figure 1:
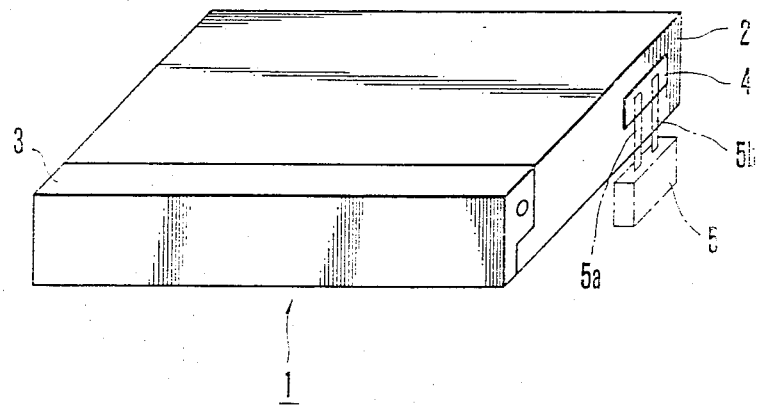
FIG. 1 is an illustration showing by way of example parts related to discriminating means arranged in accordance with the invention.

Referring to FIG. 1, parts relative to discriminating means of a recording and/or reproducing apparatus (VTR) according to the present invention includes a cassette 1 which contains a magnetic tape; a container member 2 containing cassette reels; a front lid part 3 of the cassette; and a detection member 4 which is to be detected for detection of the kind of the magnetic tape contained within the cassette 1. The detection member 4 is, for example, arranged to be an electric conductor in the case of a cassette containing a metal tape and to be a non-conductor for a cassette containing such a tape that permits recording or reproduction with a ferrite head, such as a vapor deposition or evaporation tape or the like. On the side of the apparatus is provided a switch 5. With the VTR loaded with the cassette 1, the contact pieces 5a and 5b of the switch 5 come in contact with the member 4 to be detected. In the case where a conductor is arranged as the member 4 to be detected, the switch 5 turns on when the VTR is loaded with the cassette 1. Where a non-conductor is arranged as the member 4 to be detected, the switch 5 remains off with the VTR loaded with the cassette 1. In other words, the kind of the magnetic tape to be used is thus discriminated with the switch 5 arranged to turn on only where metal tape is contained in the cassette 1.

Figure 3:
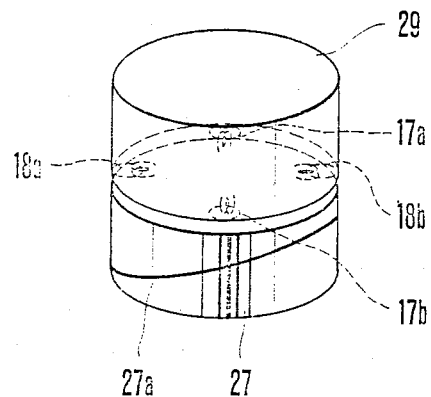
FIG. 3 is an oblique view showing the head arrangement of the VTR of FIG. 2.
Figure 2:
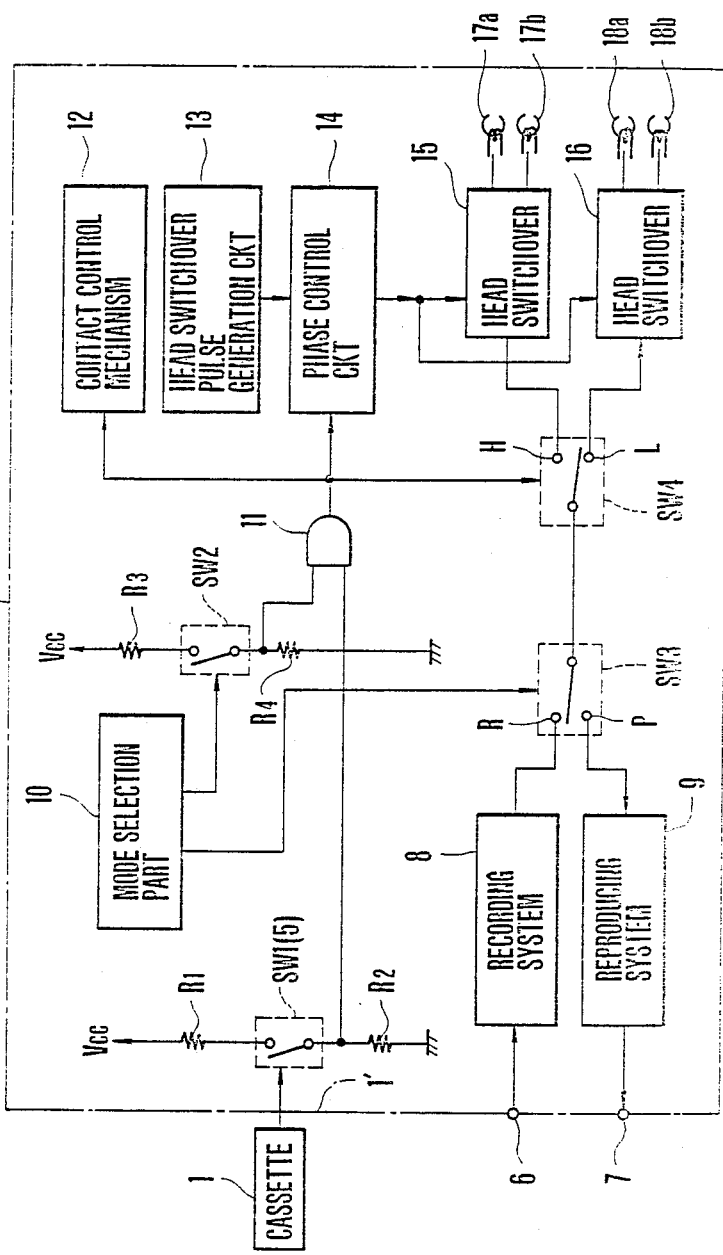
FIG. 2 is a circuit diagram showing the arrangement of a VTR according to the invention.

An example of circuit arrangement of the VTR according to the invention is as shown in FIG. 2. The head arrangement of the VTR is as shown in FIG. 3. Referring to FIG. 2, a cassette loading part 1' of the body 100 of the VTR is loaded with the cassette 1 which is provided with the part 4 to be detected as shown in FIG. 1. A detection switch 1 which is indicated by a numeral 5 in FIG. 1 turns on when a metal tape is to be used. Resistors R1 and R2 are provided for distributing a power source voltage Vcc to the input terminal of an AND gate 11. The VTR is provided with a known recording circuit including a video signal input terminal 6, a video signal output terminal 7, an FM modulation circuit 8, a frequency conversion circuit, etc. The VTR is further provided with a mode selection part 10 including a switch for switch-over between recording, reproducing, quick feeding and quick rewinding modes, etc. When the mode selection part 10 is set at the recording mode position, a switch SW2 turns on and a switch SW3 is connected to one side R thereof as shown in FIG. 2. In the case of the reproducing mode, the switch SW3 is connected to the other side P.

With the switch SW2 turned on, a voltage obtained by distributing the power source voltage Vcc via resistors R3 and R4 (higher than the threshold voltage of the AND gate 11) is supplied to the AND gate 11. The AND gate then produces a high level output when both the switches SW1 and SW2 are on. In other words, the AND gate 11 produces a high level output only in the case where a metal tape is used in the recording mode.

The output of the AND gate 11 is supplied to a contact control mechanism 12, a phase control circuit 14 and the switch SW4. The contact control mechanism 12 is arranged to bring a Sendust head which is not shown into contact with a magnetic tape when the AND gate 11 produces an otuput as will be further described later.

There is provided head switch-over pulse generation circuit 13 which is arranged to produce head switch-over pulses in response to rotary drum phase detection pulses or a vertical synchronizing signal of a video signal, etc. Meanwhile, it is impossible to have Sendust heads 17a and 17b and ferrite heads 18a and 18b arranged in the same places. Referring to FIG. 3, a head assembly consists of a staionary lower drum 27 which is provided with a tape guide body 27a and a rotary upper drum 29. In this head assembly, the pair of heads 17a and 17b and another pair of heads 18a and 18b are mounted on the upper drum 29 at locations respectively differing 180° in phase angle from each other within each paired arrangement. Meanwhile, there is a phase angle difference of, say, 90° between the head 17a and the head 18a. The head phase obtained with the Sendust heads 17a and 17b used, therefore, differs from the head phase obtained with the ferrite heads 18a and 18b used. Thereofre, the phase of the head switch-over pulse must be varied as much as the difference in head phase by means of a phase control circuit 14. In the case of the specific example shown in FIG. 2, the phase of the head switch-over pulses is arranged to be varied when the AND gate 11 produces an output, i.e. when the Sendust heads 17a and 17b are to be used while the pulses are produced on the assumption that the VTR normally use the ferrite heads 18a and 18b. A switch SW4 is provided for selection of the kind of the heads to be used. When there is an output of the AND gate 11, the switch SW4 is connected to one side H thereof to permit recording or reproduction with the Sendust heads 17a and 17b. When no output is produced from the AND gate 11, the switch SW4 is connected to the other side L as shown in FIG. 2 to permit recording or reproduction with the ferrite head 18a and 18b.

Figure 4:
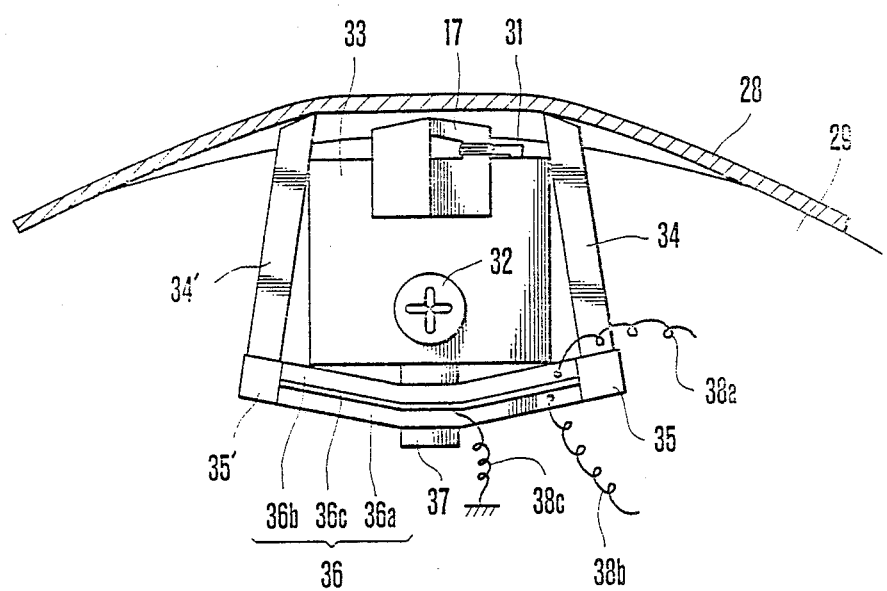
FIG. 4 shows an example of the structural arrangement of control means employed in the VTR according to the invention.

An example of a head driving mechanism 12 (a contact control mechanism 12) is arranged as shown in FIG. 4. In FIG. 4, a reference numeral 28 denotes a magnetic tape and 29 the rotary upper drum. The rotary drum 29 is shown as viewed in its axial direction. The Sendust head 17 is provided with a winding 31. A head base 33 is secured to the rotary drum 29 by means of a screw 32. In using a metal tape in the recording mode, that is, when the AND gate 11 of FIG. 2 produces a high level output, the Sendust head 17 is allowed to sufficiently protrude to adequately permit signal recording on the magnetic tape and is secured in place by the screw 32. Guard plates 34 and 34' which serve as cover members are arranged to keep the head 17 away from the tape 28 to prevent the former from coming into contact with the latter. These plates 34 and 34' are attached to support blocks 35 and 35' provided at two ends of a bimorph block 36 which is composed of a pair of piezo-electric elements 36a and 36b an an electric conductor 36c. A numeral 37 denotes a supporting fulcrum provided for the block 36.

Figure 5:
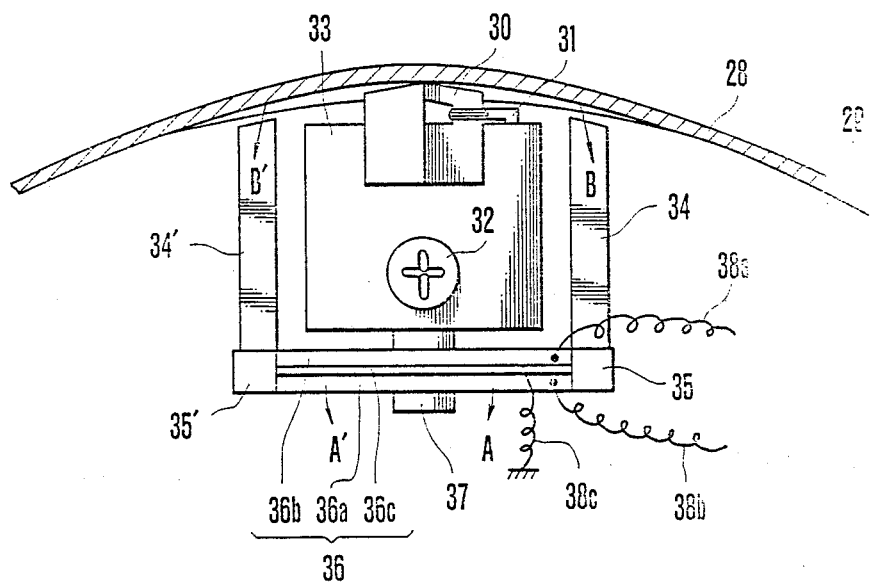
FIG. 5 shows the control means shown in FIG. 4 as in an energized state.

The head driving mechanism operates as follows: When the AND gate 1 shown in FIG. 2 produces an output, a driving voltage is supplied to the terminals 38a and 38b of the block 36. FIG. 5 shows the head driving mechanism of FIG. 4 as in a state of having the driving voltage applied thereto. With the driving voltage applied to the terminals 38a and 38b, the block 36 is bent in the directions of arrows A and A' as shown in FIG. 5. This causes the guard plates 34 and 34' to move in the directions of arrows B and B' so that these plates 34 and 34' no longer protrude from the rotary drum 29. As a result of that the head 17 becomes sufficiently protrudent to come in contact with the magnetic tape 28 for adequate signal recording thereon.

In accordance with the arrangement of the specific embodiment of the invention as shown in FIGS. 1–5, the Sendust heads are arranged to be used only when a metal tape is to be used and only in the recording mode. With the exception of such limited occasions, the Sendust heads never come in contact with the magnetic tape. The invented arrangement effectively reduces the frequency of the use of the Sendust heads which are inferior in durability, so that the service life of the VTR can be lengthened. The ferrite heads may be provided with a similar mechanism. However, the life of the ferrite heads is by far longer than that of the Sendust head. Therefore, frequent contact of the ferrite heads with the magnetic tape presents no problem.

Figure 6:
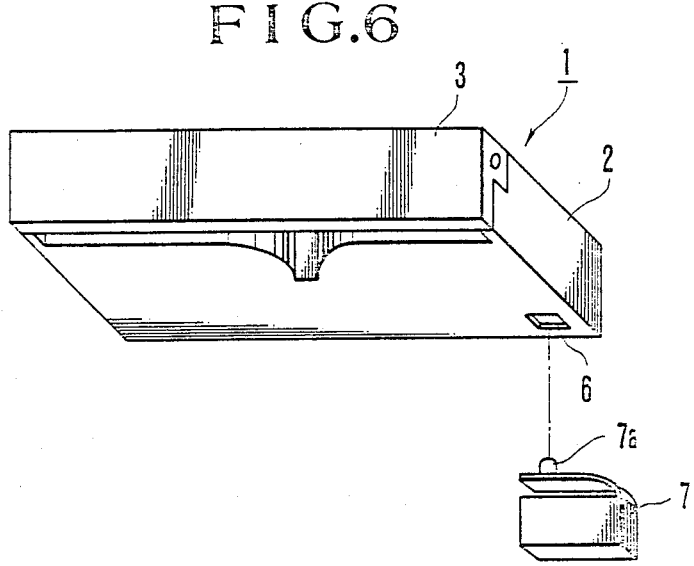
FIG. 6 shows as another example of the parts related to discriminating means of the invention.

FIG. 6 shows another example of parts related to discriminating means arranged in accordance with the present invention. In this example, a hole 6 for discriminating the kind of the tape is provided in the bottom part of the cassette 1. The example can be made applicable to the circuit arrangement of FIG. 2 in the following manner: The hole 6 is provided in a cassette containing a tape of the kind such as a vapor deposition tape (or an evaporation tape) that permits recording or reproduction with a ferrite head. Meanwhile, in the case of a cassette containing a metal tape, the hole 6 is plugged up. A switch 7 is arranged in a position corresponding to the hole 6 and is not caused to turn on when the VTR is loaded with a cassette containing a vapor deposition tape as the protrudent part 7a of the switch 7 is allowed to enter the hole 6 in that instance. However, when the VTR is loaded with a cassette containing a metal tape, the protrudent part 7a is pushed by the cassette to cause the switch 7 to turn on.

Figure 7:
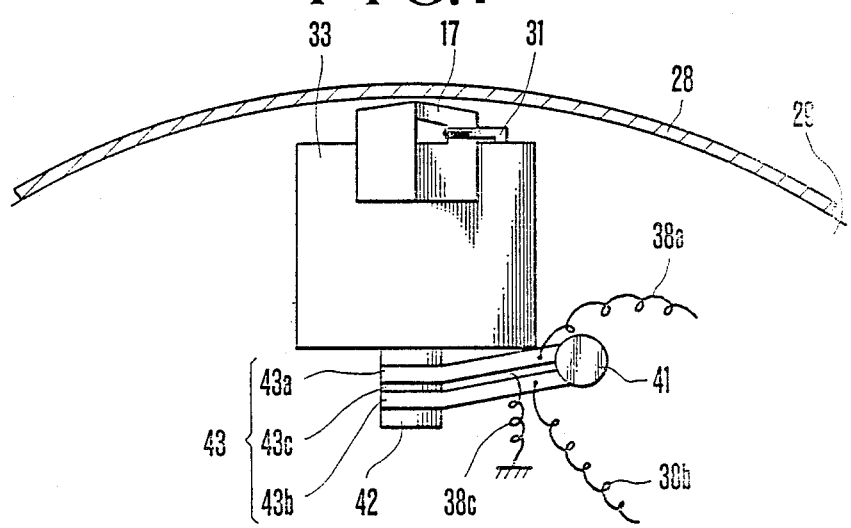
FIG. 7 is a partially schematic view of another example of the control means structural arrangement employed in the VTR according to the invention.

FIG. 7 shows another example of the head driving mechanism 12. In FIG. 7, the same parts as those shown in FIG. 4 is indicated by the same reference numerals. A bimorph block 43 which is composed of piezo-electric elements 43a and 43b and a conductor 43c is attached to a fulcrum 41. A support block 42 which is connected to a head base 33 is attached to the block 43. A driving voltage is supplied from the head driving circuit 12 shown in FIG. 2 to the terminals 38a and 38b.

Figure 8:
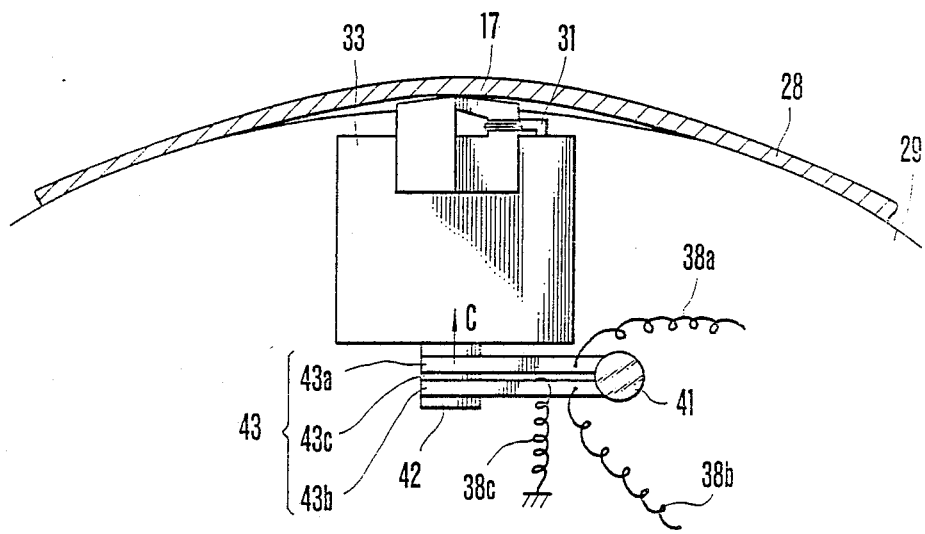
FIG. 8 shows the structural arrangement shown in FIG. 7 as in an energized state.

FIG. 8 shows the head driving mechanism shown in FIG. 7 as in a state of having the driving voltage applied thereto. With the driving voltage applied to the piezoelectric elements 43a and 43b, the block 43 bends in the direction of arrow C as shown in FIG. 8. As a result of that, the head 17 comes to protrude from the outermost periphery of the rotary drum 29 and thus comes in contact with a magnetic tape 28. This permits signal recording on the magnetic tape 28 with the Sendust head 17. Under the condition wherein the driving voltage is not supplied to the piezo-electric elements 43a and 43b, the head 17 is kept out of contact with the magnetic tape 28 as shown in FIG. 7.

Figure 9:
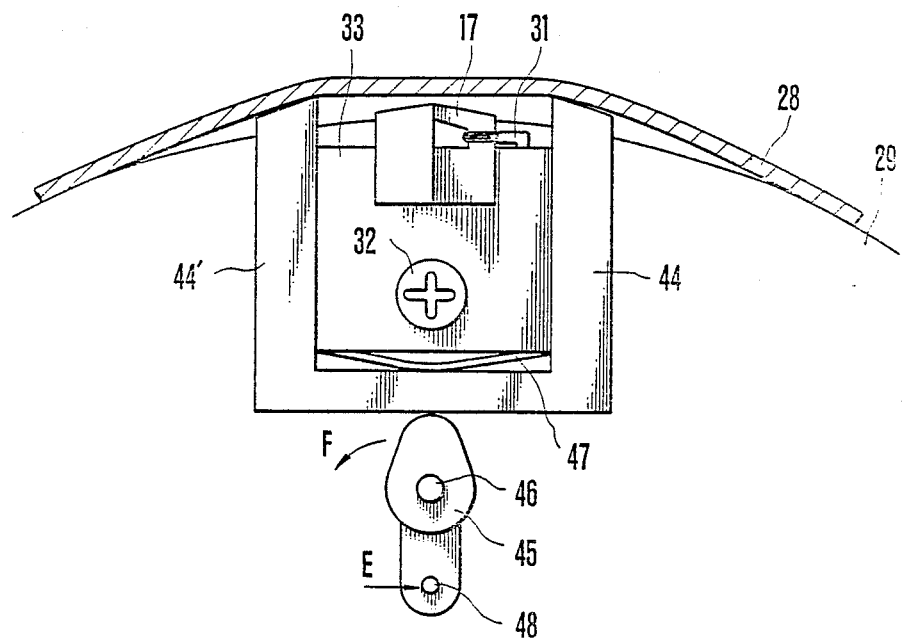
FIG. 9 shows as further example the structural arrangement of control means according to the invention.

A further example of the head driving mechanism is as shown in FIG. 9, in which the parts identical with these shown in FIG. 4 are indicated by the same reference numerals. The mechanism includes guard plates 44 and 44' which serve as cover members; a pushing piece 45 which is arranged to push the guard plates 44 and 44'; a fulcrum 46 of the pushing piece 45; an elastic member 47; and a pushing point 48 provided for the pushing piece 46.

When an output is produced from the AND gate 11 shown in FIG. 2, power supply is effected to an actuator which is not shown but consists of a solenoid circuit, etc. Then the actuator pushes the pushing point 48 in the direction of arrow E as shown in FIG. 9. This causes the pushing piece 45 to turn in the direction of arrow F. The guard plates 44 and 44' then move downward by virtue of the elastic member 47. This allows the head 17 to come in contact with the magnetic tape 28. When there is no output from the AND gate 11 on the other hand, the head driving mechanism is in the state as shown in FIG. 8 and the head 17 is kept out of contact with the magnetic tape 28.

It goes without saying that the use of the discriminating means and the head driving mechanism arranged as shown in FIGS. 6 to 9 also give the same effect as in the case of arrangement shown in FIGS. 1 to 4.

In the embodiment examples described above, a detecting part is arranged at the tape containing cassette 1 as means for discriminating the kind of the tape and the VTR is arranged to detect this detecting part. However, this method of course can be replaced with some other method in which, for example, the kind of the tape is arranged to be discriminated by detecting the magnetic characteristic or electric resistance or other electric characteristics of the tape.

The circuit arrangement shown in FIG. 2 is nothing else but an example while many variations and modifications may be arranged according to the discriminating means and the head selecting means employed.

Further, in this specification, the apparatus having two kinds of heads including the ferrite head and the Sendust head has been described by way of example. However, the invention is not limited to the use of such heads but is applicable to an apparatus using other heads suited for use of any recording media to be developed in the future. For example, in an apparatus having three kinds of heads, it is conceivable that the apparatus is arranged to use heads of one kind while keeping heads of other kinds out of contact with the recording medium.

While a VTR of the two-head type has been described, the present invention is applicable also to other recording and/or reproducing apparatuses having more than two kinds of heads.

As apparent from the foregoing description of the embodiment examples, the invented arrangement to control the contact of the head with the recording medium not only permits use of recording media of at least two different kinds but also gives a recording and/or reproducing apparatus of a very long service life.

What I claim:

1. A magnetic recording and reproducing apparatus, comprising:
   (a) a first magnetic head;
   (b) a second magnetic head having inferior wear resistance to said first magnetic head and having different magnetic characteristics from that of said first magnetic head;
   (c) holding means for holding a magnetic record bearing medium;
   (d) discriminating means for discriminating whether the magnetic record bearing medium held by said holding means is a medium on which a predetermined information can be recorded by said first head;
   (e) mode changeover means for changing over the apparatus between a recording mode and a reproducing mode; and
   (f) control means responsive to said discriminating means and said mode changeover means for inhibiting said second head to contact said medium except when the apparatus is in the recording mode and said discriminating means discriminates that the medium held by said holding means is a medium on which the information cannot be recorded by the first head.

2. An apparatus according to claim 1, wherein said first magnetic head has a core made of ferrite and said second magnetic head has a core made of Sendust alloy.

3. An apparatus according to claim 1, wherein said first and second magnetic heads are arranged rotatably near an outer circumference of a common cylindrical member.

4. An apparatus according to claim 3, wherein said control means includes a drive member for driving said second magnetic head in a radial direction of said cylindrical member and is arranged to inhibit the contact of said second magnetic head with said magnetic record bearing medium by retracting said second magnetic head into the outer circumference of said cylindrical member.

5. An apparatus according to claim 3, wherein said control means includes a cover member for covering said second magnetic head and a drive member for driving said cover member in a radial direction of said cylindrical member.

6. A magnetic recording and reproducing apparatus arranged to selectively use a plurality of kinds of record bearing mediums including a first magnetic record bearing medium and a second magnetic record bearing medium which has a larger magnetic coercive force than that of said first magnetic record bearing medium, comprising:
(a) a first magnetic head;
(b) a second magnetic head having inferior wear resistance to said first magnetic head and having higher saturated magnetic flux density than that of said first magnetic head;
(c) holding means for holding a magnetic record bearing medium;
(d) first discriminating means for discriminating that the magnetic record medium held by said holding means is said second magnetic record bearing medium;
(e) mode setting means for selectively setting the apparatus in a recording mode and a reproducing mode;
(f) second discriminating means responsive to said first discriminating means and said mode setting means for discriminating that the magnetic record bearing medium held by said holding mean is said second magnetic record bearing medium when the apparatus is in said recording mode; and
(G) control means responsive to said second discriminating means for selectively setting said first and second magnetic head in an operable state.

7. An apparatus according to claim 6, further comprising:
inhibiting means responsive to said second discriminating means for inhibiting said second head from contacting said medium held by said holding means.

8. An apparatus according to claim 6, wherein said second magnetic record bearing medium is made of magnetic alloy, and said second head has a core made of Sendust alloy.

9. A magnetic recording and reproducing apparatus arranged to selectively use a plurality of kinds of record bearing mediums including a first magnetic record bearing medium and a second magnetic record bearing medium which has a larger magnetic coercive force than that of said first magnetic record bearing medium, comprising:
(a) a cylindrical member having an outer peripheral surface;
(b) a first magnetic head arranged rotatably near the peripheral surface of said cylindrical member, said first magnetic head always projecting from the peripheral surface;
(c) a second magnetic head arranged rotatably near the peripheral surface of said cylindrical member, said second magnetic head having inferior wear resistance to said first magnetic head and having higher saturated magnetic flux density than that of said first magnetic head;
(d) driving means for driving said second magnetic head in a radial direction of said cylindrical member between a first position at which said second magnetic head is projected from the peripheral surface and a second position at which said second magnetic head is retracted into the peripheral surface;
(e) holding means for holding a magnetic record bearing medium;
(f) first discriminating means for discriminating that the magnetic record bearing medium held by said holding means is said second magnetic record bearing medium;
(g) mode setting means for selectively setting the apparatus in a recording mode and reproducing mode;
(h) second discriminating means responsive to said first discriminating means and said mode setting means for discriminating that the magnetic record bearing medium held by said holding means in said second magnetic record bearing medium when the apparatus is in said recording mode; and
(i) control means responsive to said second discriminating means for controlling said drive means.

10. A magnetic recording and reproducing apparatus arranged to selectively use a plurality of kinds of record bearing mediums including a first magnetic record bearing medium and a second magnetic record bearing medium which has a larger magnetic coercive force than that of said first magnetic record bearing medium, comprising:
(a) a cylindrical member having an outer peripheral surface;
(b) a first magnetic head arranged rotatably near the peripheral surface of said cylindrical member, said first magnetic head always projecting from the peripheral surface;
(c) a second magnetic head arranged rotatably near the peripheral surface of said cylindrical member, said second magnetic head having inferior wear resistance to said first magnetic head and having higher saturated magnetic flux density than that of said first magnetic head;
(d) driving means for driving said second magnetic head in a radial direction of said cylindrical member between a first position at which said second magnetic head is projected from the peripheral surface and a second position at which said second magnetic head is retracted into the peripheral surface;
(e) holding means for holding a magnetic record bearing medium;
(f) first discriminating means for discriminating that the magnetic record bearing medium held by said holding means is said second magnetic record bearing medium; and
(g) control means responsive to said discriminating means for controlling said driving means.

11. A magnetic recording and reproducing apparatus arranged to selectively use a plurality of kinds of record bearing mediums including a first magnetic record bearing medium and a second magnetic record bearing medium which has a larger magnetic coercive force than that of said first magnetic record bearing medium, comprising:
(a) a cylindrical member having an outer peripheral surface;
(b) a first magnetic head arranged rotatably near the peripheral surface of said cylindrical member, said first magnetic head always projecting from the peripheral surface;
(c) a second magnetic head arranged rotatably near the peripheral surface of said cylindrical member, said second magnetic head having inferior wear resistance to said first magnetic head and having higher saturated magnetic flux density than that of said first magnetic head;
(d) driving means for driving said second magnetic head in a radial direction of said cylindrical member between a first position at which said second magnetic head is projected from the peripheral surface and a second position at which said second magnetic head is retracted into the peripheral surface;

(e) holding means for holding a magnetic record bearing medium;

(f) mode setting means for selectively setting the apparatus in a recording mode and a reproducing mode; and (g) control means responsive to said mode setting means for controlling said driving means.

* * * * *